Nov. 21, 1939.　　　　B. H. SHOEMAKER　　　　2,180,372
PROCESS OF MAKING GASOLINE
Filed Dec. 11, 1936
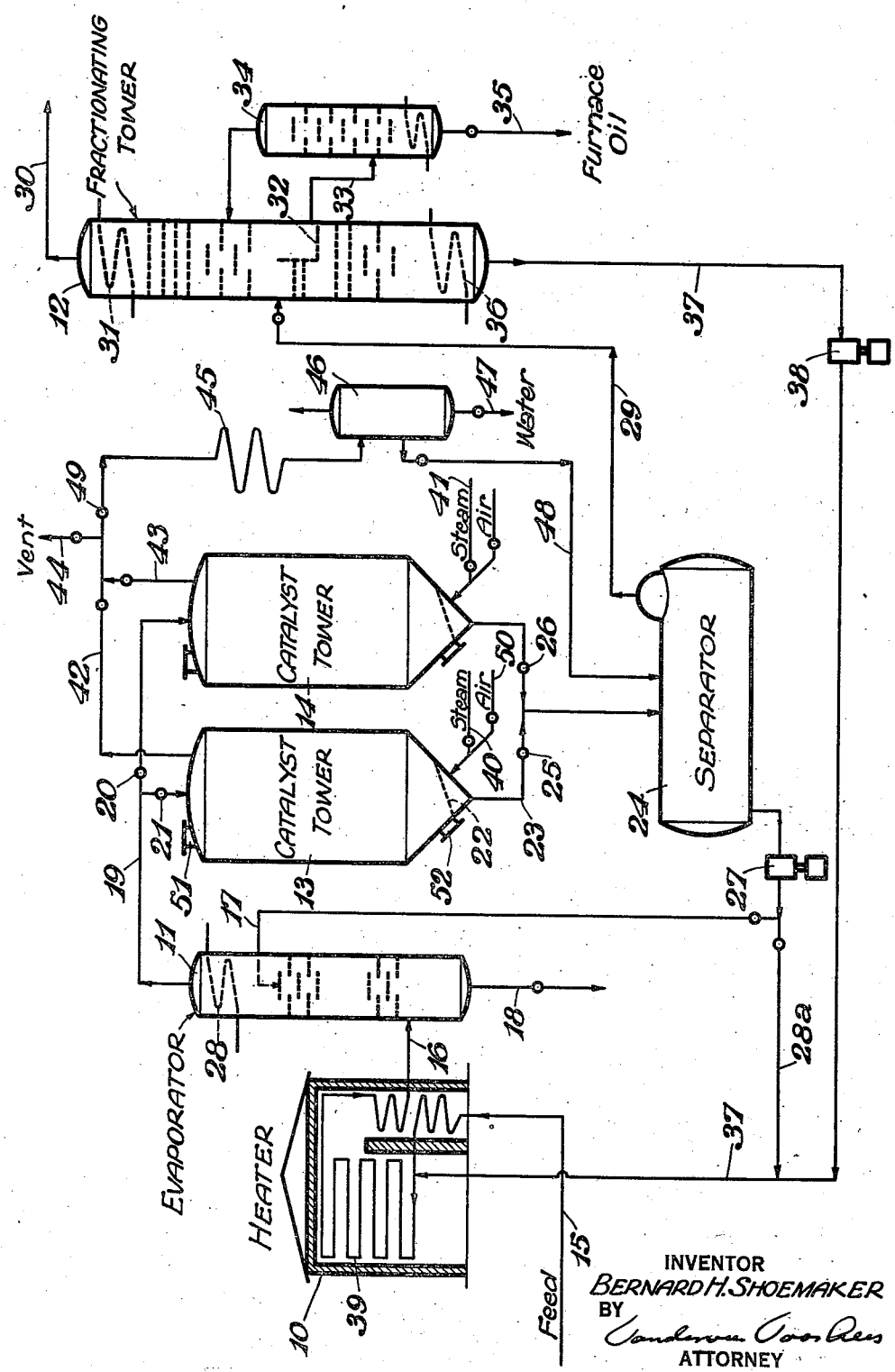
INVENTOR
BERNARD H. SHOEMAKER
BY
ATTORNEY Patented Nov. 21, 1939

2,180,372

UNITED STATES PATENT OFFICE 2,180,372

PROCESS OF MAKING GASOLINE

Bernard H. Shoemaker, Hammond, Ind., assignor to Standard Oil Company, Chicago, Ill., a corporation of Indiana Application December 11, 1936, Serial No. 115,293

2 Claims. (Cl. 196—28)

This invention relates to the process of making gasoline from heavier oils and more particularly from oils of the type known as gas oil wherein the oil is subjected to cracking and is subsequently separated into gasoline and other fractions. One object of the invention is to produce a gasoline directly from the cracking process which does not require sweetening or the removal of mercaptans. Another object of the invention is to provide a process for producing a gasoline which has a higher knock rating than that of cracked gasolines ordinarily produced under similar conditions of cracking temperatures and pressures. Still another object of the invention is to produce a recycle oil in the cracking process which has less tendency to deposit objectionable carbon in the cracking reaction zone and also less tendency to cause corrosion of the cracking equipment, resulting from the presence of sulfur compounds which ordinarily accumulate in said recycle oil. Other objects and advantages of the invention will become apparent from the following description.

Referring to the drawing which forms a part of this specification, 10 is a pipe heater typical of those used in cracking operations and 11 is an evaporator tower into which the vapors from the heater are injected. A fractionating tower 12 is provided for separating the product into gasoline, furnace oil and recycle oil. Interposed between the evaporator tower and the fractionating tower are clay treating chambers 13 and 14 which are connected in parallel, enabling them to be used alternately, the hot vapors from the evaporator 11 passing through one of said clay towers and thence to said fractionating tower.

As an example of the operation of my process I may introduce Mid-Continent gas oil by line 15 into heater 10 where it is heated to a high cracking temperature. The temperature in the transfer line 16 passing to the evaporator, for example, may suitably be between 850 and 1000° F. and a temperature of 900 to 925° F. is usually satisfactory. A quenching liquid may be introduced into the transfer line preceding the evaporator when it is desired to reduce the temperature of the vapors.

The hot vapors entering the evaporator pass upward in counterflow to a descending current of reflux liquid introduced by line 17 whereby the temperature is reduced to about 700 to 800° F. and the heavy constituents are condensed and discharged as a tar or fuel oil from the base of the evaporator by line 18. It is usually desirable to further reduce the tar in a tar stripper—not shown—connected by line 18, from which the distillate fraction is recycled to the cracking coil 39. The uncondensed vapors are led by line 19 to clay tower 13, valve 20 being closed and valve 21 being open. Clay towers 13 and 14 may suitably be provided with a perforated screen-covered false bottom 22 on which rests a bed of catalyst in porous form, permitting the oil vapors to pass downward therethrough and out through line 23 leading to separator 24, valve 25 being open and valve 26 being closed.

Any condensate which collects in separator 24, including polymerized higher boiling hydrocarbons formed from the vapors by the action of the catalyst in chamber 13 is forced by pump 27 through line 17 to the top of evaporator 11 as reflux liquid. If the amount of such reflux liquid available is insufficient to control the vapor temperature at the top of evaporator 11, additional cooling is supplied by reflux coil 28. However, if the amount of condensate in separator 24 accumulates beyond that needed for reflux in tower 11, it may be by-passed through valved line 28a leading to the cracking coil 39.

The vapors from separator 24 are conducted by line 29 to fractionator 12 wherein they are separated into an overhead vapor fraction comprising gasoline and gases withdrawn by line 30 to suitable condensing and stabilizing apparatus not shown. Reflux condensate formed in fractionator 12 by reflux coil 31 passes downward through the column and collects in trap-out plate 32 from which a portion may be withdrawn by line 33 to sidestripper 34. The bottoms are withdrawn from stripper 34 by line 35 and form kerosene or furnace oil—one of the desired products of the process.

The remaining reflux liquid passes down through column 12 where it is subjected to reboiling by coil 36 and thence is conducted by line 37 and pump 38 to an intermediate point of the pipe heater coil 39 where it is further cracked by the high temperature prevailing therein.

In commencing the operation of the process it is desirable to preliminarily heat the catalyst in towers 13 and 14 to the desired catalyst treating temperature, i. e., 700 to 750° F. and this may be conveniently accomplished by the introduction of superheated steam through lines 40 and 41, the steam being withdrawn from the catalyst chambers by lines 42 and 43 and either vented to the atmosphere by vent 44 or condensed in coil 45 leading to separator 46 from which condensed water is withdrawn by line 47.

When the catalyst becomes spent or loses a large part of its efficiency in the catalyst chamber which is in operation, the hot vapors from evaporator 11 are diverted to the other catalyst chamber and the spent catalyst is regenerated or replaced by fresh catalyst. If it is regenerated this may be accomplished by introducing steam through lines 40 or 41 as before to remove as much volatile hydrocarbon material as possible. Referring to catalyst chamber 13, valves 25 and 21 are closed during this operation and the steam and volatilized hydrocarbons are withdrawn through line 42 to condenser 45 and separator 46 where hydrocarbon collects and is withdrawn by line 48 leading to separator 24. After the hydrocarbon has been steamed out, valve 49 in line 42 is closed and vent 44 is opened and at the same time a current of preheated air is introduced by valved line 50; the air coming in contact with the catalyst produces a combustion of the residual organic material and carbon deposited thereon and the rate of combustion is controlled by regulating the amount of steam introduced by line 40 at the same time. After combustion is complete the catalyst chamber is thoroughly steamed out to remove any air contained in it and the catalyst is then ready for treating more hydrocarbon vapor.

If desired, the catalyst may be removed by manways 51 and 52 and regenerated in a separate apparatus.

One of the unique features of my process is the control of the temperature in the catalyst chambers within the critical range for satisfactory treating. I have found temperatures below 700° F. are ineffective for producing the desired results of sweetening and increasing knock rating of the final gasoline distillate. Temperatures above 800° F. are likewise undesirable in that excessive coking of hydrocarbons occurs on the surface of the catalyst, with the result that the catalyst life is so short as to make the process entirely uneconomical, and I prefer to maintain the catalyst temperature below 750° F. The temperature of the catalyst towers is most conveniently regulated by controlling the reflux on tower 11 and thus controlling the temperature of the incoming vapor. The sweetening effect of the catalyst appears to be brought about by decomposition of the mercaptans with the formation of hydrogen sulfide which may be removed from the gasoline along with other gases in the stabilizer or may be absorbed by a suitable alkali such as sodium hydroxide solution. Accordingly, I obtain a desulfurization of the gasoline in addition to sweetening.

The effect of the catalyst on improving the knock rating of the gasoline is shown in the following table where the knock rating is expressed as octane number improvement. The gasoline without the catalyst treatment possessed an octane number of 65.5. Several different catalysts were employed as indicated in the table.

| Catalyst | Temperature | Total yield bbls./ton of catalyst | Knock rating imprv. C. F. R. motor | Yield of sweet gasoline (bbls./ton of catalyst) |
| --- | --- | --- | --- | --- |
| | °F. | | | |
| Fuller's earth (Florida) | 750 | 1017 | 2.1 | 483 |
| Fuller's earth (Illinois) | 750 | 684 | 1.9 | 300 |
| Brucite | 750 | 1420 | 0.5 | 1303 |
| Lime | 750 | 805 | 0.0 | 638 |

The brucite is a natural magnesia hydrate. Yields given are the amount of gasoline throughput before revivifying the catalyst.

The pressure employed in my process may vary considerably, but it is desirable to conduct the operation at a pressure between 100 and 400 pounds per square inch. Pressures as high as 750 pounds may be used but in that case it is desirable to reduce the pressure at the transfer line and/or between the evaporator and the catalyst chamber by a suitable pressure reducing valve. If desired, I may also operate the heater and evaporator at a pressure of about 100 to 400 pounds per square inch and operate the catalyst chamber at atmospheric pressure. By operating the catalyst chambers at the same pressure as the evaporator, however, the vapors subjected to the catalyst are saturated in the sense that any further cooling would cause condensation. It is usually desirable to employ saturated vapors in the catalyst chamber as the catalyst life is thereby increased, requiring less revivification.

The catalyst in my process is believed to have no effect on the cracking of the hydrocarbons per se inasmuch as cracking is always accompanied by deposition of coke which rapidly destroys catalytic action. The effect of the catalyst at the temperatures which I employ is apparently due to the combined action on the sulfur compounds contained in the hydrocarbon vapors and to the molecular rearrangement of some unsaturated molecules. It has been found, for example, that certain sulfur compounds, particularly mercaptans, sulfides and disulfides have an adverse effect upon the knock rating of the gasoline and it appears that the present process removes certain of these undesirable sulfur compounds by converting them into hydrocarbons and hydrogen sulfide. This is supported by the fact that mercaptans are removed from a large part of the gasoline.

I have found that the higher boiling sulfur compounds are most difficult to decompose by the action of a catalyst and one of the advantages of my process is the separation of such high boiling sulfur compounds in separator 24 and fractionator 12 combined with recycling these high boiling sulfur compounds back to the heater 10 and evaporator 11 whence they are again returned to the catalyst chamber for repeated treatment. In this manner I have found it possible to remove a larger proportion of those sulfur compounds which have an adverse effect on the knock rating of the gasoline.

Although I have described the process with regard to certain specific operations it should be understood that my process may be employed in various other ways with other hydrocarbon materials. For example, instead of gas oil I may employ as a feed stock a heavy naphtha of low knock rating, e. g., 45 octane number, in which case the operation will consist of reforming the low knock rating heavy naphtha to produce higher knock rating gasoline. In this case the gasoline content of the vapors entering the catalyst chambers 13 and 14 will be considerably higher than in the case where gas oil is the charging stock to the process. When charging gas oil, for example, the vapors entering the catalyst chamber will usually contain not more than 25 to 40% of gasoline. A typical analysis of these vapors is as follows:

9% at 158° F.
25% at 400° F.
90% at 600° F.
Max. 700° F.

It will be noted from this distillation that these vapors contained about 25% of gasoline and therefore about 75% of vapor treated in the clay chambers is separated and recycled in the process.

Although I have described specific catalysts such as Florida and Illinois fuller's earth, it should be understood that I may use any of the well-known argillaceous catalytic materials, including bentonite, Death Valley clay, acid treated clays, bauxite, etc. It is desirable, however, that the catalyst employed have a high fusion point in order that it may be repeatedly regenerated by combustion as described.

I claim:

1. The process of producing high knock rating gasoline from heavy hydrocarbon oil, comprising heating the hydrocarbon oil charging stock to cracking temperature and converting about 25% to 40% thereof to gasoline, separating unvaporized heavy residue from the vapors of gasoline and unconverted heavy oil, cooling said vapors of gasoline and unconverted heavy oil and contacting them with a catalytic mass of argillaceous earth at a temperature between 700 and 800° F., thereafter conducting the vapors to a fractionating zone, therein separating gasoline from unconverted heavy oil and recycling said unconverted heavy oil, consisting of about 60% to 75% of the charging stock, to said cracking step.

2. The process of claim 1 wherein the pressure of the vapors in the catalytic mass is maintained between about 100 and 400 pounds per square inch.

BERNARD H. SHOEMAKER.